J. W. PLANT.
METHOD OF ELECTRICALLY WELDING STEEL.
APPLICATION FILED APR. 29, 1919.
1,354,266.  Patented Sept. 28, 1920.
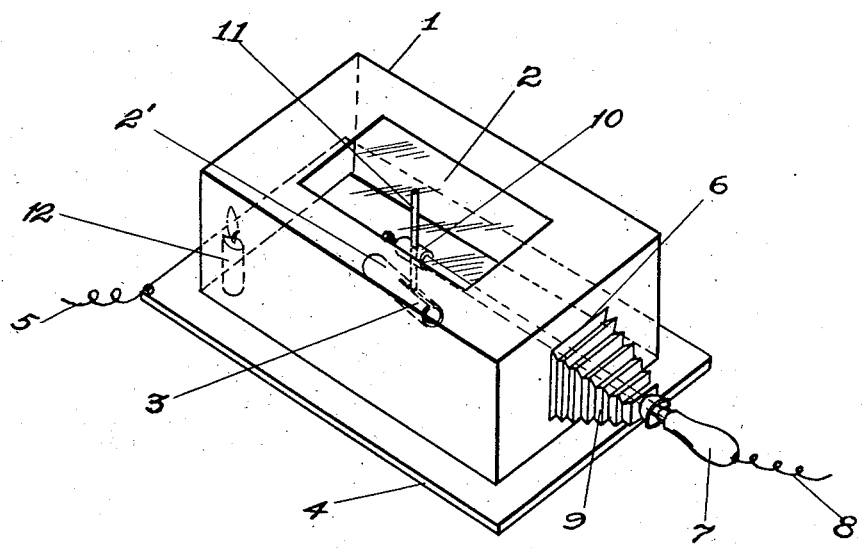
WITNESS
Wm F. Drew
INVENTOR
John W. Plant
BY
Acker & Totten
ATTORNEYS

UNITED STATES PATENT OFFICE.

JOHN W. PLANT, OF SAN MATEO, CALIFORNIA.

METHOD OF ELECTRICALLY WELDING STEEL.

1,354,266.   Specification of Letters Patent.   Patented Sept. 28, 1920.

Application filed April 29, 1919. Serial No. 293,459.

*To all whom it may concern:*

Be it known that I, JOHN W. PLANT, a citizen of the United States, residing at San Mateo, in the county of San Mateo and State of California, have invented certain new and useful Improvements in Methods of Electrically Welding Steel, of which the following is a specification.

The hereinafter described invention relates to a method for the electric welding of manganese steel or other alloy steels, either for the union of two pieces of said metal or for the repair of worn, cracked or damaged articles constructed therefrom, such, for instance, as dredger buckets, scoop shovels and similar parts, which by reason of the hard usage to which they are subjected quickly become damaged to such an extent as require the scraping thereof and the consequent loss of considerable available metal.

As electric welding of manganese or other alloy steels is carried out at the present time, the same is conducted in an atmosphere of oxygen, with the result that there is a formation of slag between the joint union due to the chemical constituents of the metal becoming oxidized in the electric arc which is formed when the electrode is brought into contact with the metal to be welded or where the fused ends of two bars or pieces of the metal to be united are brought together, with the result that an imperfect weld is formed, or, in other words, the point where the welding takes place does not possess the same strength for resisting strains as the remainder of the metal, due to the deoxidization brought about by the action of the oxygen relative to the chemical constituents of the material. It is this slag formation and oxidization of the metal during the electric welding which the present invention is designed to obviate.

I have found from practical operation and experimentation on maganese steel and other alloy steels, that if the welding is done in a non-oxidizing atmosphere and the electrode utilized be constructed of the same material as the metal to be welded, that there is no slag formation and oxidization does not take place in the electric arc which is formed when the electrode is brought into contact with the metal, with the result that there is a perfect welding of the metal and the welded or repaired part of the metal is equal in strength and resistance to the original body of the metal itself, By the use of the present method of welding, I am enabled to successfully repair broken, cracked or damaged steel articles of manufacture and restore the same to their original condition and give to the repaired part the same condition of strength and wear qualities as originally possessed thereby, thus permitting working parts of machinery ordinarily scraped or discarded as being unfit for further service to be restored to working condition, thus creating a large saving in money heretofore lost and avoiding the delays incident to the replacing of damaged articles.

Any suitable means may be employed in carrying out the method of invention, the only essentials being that the metal to be welded shall be enveloped in a non-oxidizing atmosphere and that the electrode shall be formed of the same material as the metal to be welded or repaired.

The annexed drawing discloses a simple, inexpensive and efficient means for the carrying out of the invention, wherein is illustrated a welding box in perspective.

In the drawings, the numeral 1 is used to designate a suitably constructed air tight box, which is provided with a glass covered inspection opening 2, through which the article to be welded or repaired may be inserted. In the present case, the said article is indicated as a hollow, cylindrical piece of manganese or other alloy steel 2, disclosed as cracked at 3, and which cracked portion is to be repaired. The box 1 is fitted onto a metal base 4 on which rests and is supported the article to be repaired, the said base being connected to a return wire 5. At one portion of the box is provided an insertion opening 6, through which is extended an electrode holder 7 to which is attached the supply wire 8. This opening 6 is closed or covered in the present case by a rubber or other impervious conical shaped piece of material 9, the free ends of which are secured around the electrode holder 7 to make an air tight joint. At its inner end the holder 7 carries a clamp piece 10 for securing therein an electrode 11, said electrode being composed of the same material chemically as the metal of the part to be welded or repaired.

Prior to commencing the operation of welding and with the article to be welded and the electrode inserted within the welding box, all oxygen is exhausted therefrom in any suitable manner, as, for instance by placing a lighted candle 12 therein for consuming the oxygen, or by forcing nitrogen or other gas in which oxygen is not present in a free state into the welding box until the air is forced out. With the oxygen thus removed, the operator turns on the electric current and as the part to be welded is in contact electrically with the metal base plate to which one of the wires is connected, there is established a perfect circuit through the electrode, which causes a melting and a welding of the fused metal with the metal of the part to be welded, which fused metal completely fills the crack to be closed therein or in case of a broken part gradually builds up the same, the operator manipulating the electrode from the outside and noting the progress of the work through the inspection opening 2 of the welding box.

The invention may be applied to purposes other than the repairing of steel, as, for instance, the building-up of worn out parts with new material so that the part will be restored to its original shape and thus returned to its usefulness, it always being understood that the electrode to be used in the electrode holder must be of the same chemical composition as the part to be repaired or built up.

By the use of the invention, the operator is enabled to do a piece of welding, repairing or building up without the formation of slag which interferes and prevents perfect welding, and he may manually direct the electric arc to the part which he wishes to work on while the said part is surrounded by a non-oxidizing atmosphere.

In certain cases, it might be advantageous to connect the wire direct to the part to be welded instead of to the metallic base plate, the idea being to have the flow of current through a manually manipulated electrode of the same chemical composition as the part to be welded, built up or repaired while the said part and electrode is enveloped or surrounded by a non-oxidizing atmosphere and this irrespective of the means for producing such atmosphere.

It is required that after the part has been welded, repaired or built-up, that the same be heat treated for the purpose of tempering and giving thereto the proper degree of hardness, strength and toughness.

While I have employed the term manganese steel as expressive of the character of the metal for the treatment of which the present invention is more particularly utilized, still I do not wish to be understood as so limiting the same, for I am well aware that it is applicable for the treatment of carbon steel and therefore wish to be understood by the expression "other alloy steel" as including therein carbon steel.

Having thus described my invention, what I claim as new and desire to protect by Letters Patent is:—

1. The improvement in the art described, which consists in introducing the part to be welded and an electrode formed of corresponding material within a welding chamber, expelling the oxygen from said chamber so as to provide a surrounding non-oxidizing atmosphere, thence passing an electric current through the confined parts for a fusing of the electrode with the metal to be welded or repaired without causing oxidization of the metal in the arc formed on the electrode being brought into contact with the metal to be treated.

2. The improvement in the art described which consists in positioning the body to be treated and an electrode formed of the same material with a non-oxidizing atmosphere, passing an electric current through said positioned members for a fusing of the electrode with the metal to be treated without the formation of slag during the welding operation, and finally heat treating the welded or repaired part for the tempering thereof.

In testimony whereof I have signed my name to this specification in the presence of two subscribing witnesses.

JOHN W. PLANT.

Witnesses:
N. A. ACKER,
D. B. RICHARDS.